US011880280B2

(12) United States Patent
Fullbright et al.

(10) Patent No.: US 11,880,280 B2
(45) Date of Patent: Jan. 23, 2024

(54) VARIABLE NUMBER AND SIZE OF PUT OPERATIONS FOR STORAGE BACKUP

(71) Applicant: NetApp, Inc., San Jose, CA (US)

(72) Inventors: John Keith Fullbright, Evans, GA (US); Mark Duane Beaupre, Los Gatos, CA (US); Nilesh Pradeepkumar Maheshwari, Mountain View, CA (US)

(73) Assignee: NETAPP, INC., San Jose, CA (US)

( * ) Notice: Subject to any disclaimer, the term of this patent is extended or adjusted under 35 U.S.C. 154(b) by 0 days.

(21) Appl. No.: 17/822,629

(22) Filed: Aug. 26, 2022

(65) Prior Publication Data

US 2022/0405173 A1 Dec. 22, 2022

Related U.S. Application Data

(63) Continuation of application No. 16/502,870, filed on Jul. 3, 2019, now Pat. No. 11,442,814, which is a continuation of application No. 14/994,728, filed on Jan. 13, 2016, now Pat. No. 10,372,552.

(51) Int. Cl.
*G06F 16/00* (2019.01)
*G06F 11/14* (2006.01)
*G06F 16/11* (2019.01)

(52) U.S. Cl.
CPC ...... *G06F 11/1458* (2013.01); *G06F 11/1446* (2013.01); *G06F 16/113* (2019.01)

(58) Field of Classification Search
CPC . G06F 11/1458; G06F 11/1446; G06F 16/113
See application file for complete search history.

(56) References Cited

U.S. PATENT DOCUMENTS

| 9,092,530 | B1 | 7/2015 | Fulbright et al. |
| 10,372,552 | B2 | 8/2019 | Fullbright et al. |
| 11,442,814 | B2 | 9/2022 | Fullbright et al. |
| 2012/0084261 | A1 | 4/2012 | Parab |

(Continued)

OTHER PUBLICATIONS

Ke et al., "The Crawler of Specific Resources Recognition Based on Multi-Thread," 2012 Fifth International Joint Conference on Computational Sciences and Optimization, IEEE, p. 569-572. (Year: 2012).*

(Continued)

*Primary Examiner* — Cheryl Lewis
(74) *Attorney, Agent, or Firm* — HAYNES AND BOONE, LLP

(57) ABSTRACT

A plurality of data objects is generated from a data stream received for constructing a backup image. A stream size of the data stream is determined. For each multi-threaded put operation used to write a data object of the plurality of data objects to a cloud storage, a maximum number of threads is determined into which the data object can be separated into a number of parts for simultaneous transmission to the cloud storage. A part size of each part is determined. A number of multi-threaded put operations is determined for writing the plurality of data objects to the cloud storage based, at least in part, on the stream size, the maximum number of threads into which the data object can be separated, and the part size. The plurality of data objects is stored into the cloud storage using the number of multi-threaded put operations.

20 Claims, 5 Drawing Sheets

(56) References Cited

U.S. PATENT DOCUMENTS

2013/0254326 A1     9/2013   Weng et al.
2016/0378614 A1    12/2016   Thanasekaran et al.

OTHER PUBLICATIONS

Guo et al., "Real-Time Dynamic Cloud Simulation Based on Multi-Core and Multi-Thread," 2012 Fourth International Conference on Multimedia Information Networking and Security, IEEE, pp. 241-245. (Year: 2012).*
NDMP Cloud Extension Software 1.0 Installation adn Administration Guide.
Vander T., et al., "A Multi-Threaded Coarse-Grained Array Processor for Wireless Baseband," Symposium on Application Specific Processors (SASP), 2011, pp. 102-107.

\* cited by examiner

VARIABLE NUMBER AND SIZE OF PUT OPERATIONS FOR STORAGE BACKUP

PRIORITY CLAIM

This application is a continuation of U.S. patent application Ser. No. 16/502,870, filed Jul. 3, 2019, and issued as U.S. Pat. No. 11,442,814 on Sep. 13, 2022 which is a continuation of U.S. patent application Ser. No. 14/994,728, filed on Jan. 13, 2016 and issued as U.S. Pat. No. 10,372,552 on Aug. 6, 2019. The aforementioned applications are hereby incorporated herein by reference in their entireties.

BACKGROUND

The disclosure generally relates to the field of data processing, and more particularly to data backup.

Backup and archival solutions increasingly rely on cloud service providers. A cloud service provider maintains equipment and software without burdening customers with the details. The cloud service provider provides an application programming interface (API) to customers. The API provides access to resources of the cloud service provider without visibility of those resources.

SUMMARY

In some embodiments, a data stream is received for constructing a backup image for a data set. A plurality of data objects is generated from the data stream. Generating of the plurality of data objects include determining a stream size of the data stream. Generating also includes determining, for each multi-part, multi-threaded put operation used to write a data object of the plurality of data objects to a cloud storage, a maximum number of threads into which the data object can be separated into a number of parts for simultaneous transmission to the cloud storage. Generating also includes determining a part size of each part of the number of parts. Generating includes determining a number of multi-part, multi-threaded put operations for writing the plurality of data objects to the cloud storage based, at least in part, on the stream size, the maximum number of threads into which the data object can be separated, and the part size. The plurality of data objects is stored into the cloud storage using the number of multi-part, multi-threaded put operations.

This summary is a brief summary for the disclosure, and not a comprehensive summary. The purpose of this brief summary is to provide a compact explanation as a preview to the disclosure. This brief summary does not capture the entire disclosure or all embodiments, and should not be used limit claim scope.

BRIEF DESCRIPTION OF THE DRAWINGS

Embodiments of the disclosure may be better understood by referencing the accompanying drawings.

DESCRIPTION

Figure 1:
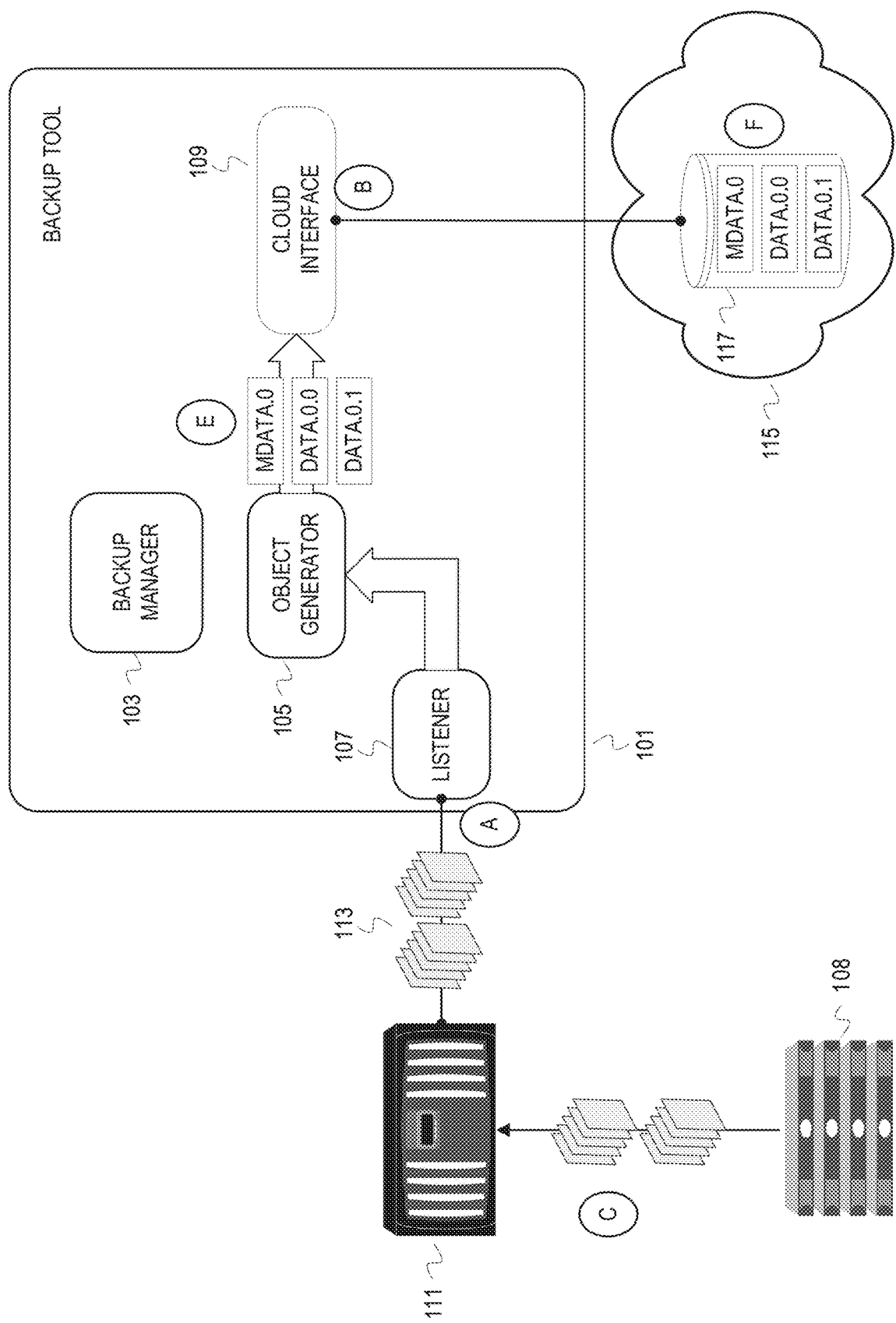
FIG. 1 depicts a conceptual diagram of a backup tool managing backup between a storage source and a cloud destination, according to some embodiments.

The description that follows includes example systems, methods, techniques, and program flows that embody techniques of the disclosure. However, it is understood that this disclosure may be practiced without these specific details. For instance, although examples refer to NDMPcopy, that particular backup tool is not necessary for embodiments. Also, although examples refer to cloud storage, the backup operations can be performed to backup to any other type of object-based storage. In other instances, well-known instruction instances, protocols, structures and techniques have not been shown in detail in order not to obfuscate the description.

Introduction

The network data management protocol (NDMP) is an open protocol for data management intended to allow a network backup application to control backup and retrieval at an enterprise level with network level interoperability and without third party software. NDMPcopy can be considered a backup tool within the NDMP framework. NDMPcopy transfers data in accordance with NDMP. NDMPcopy manages a data transfer directly between a source device and a destination device. A supporting network will not be required to transfer data among three entities: 1) the source device, 2) the destination device, and 3) a host of the process(es) instantiated for NDMPcopy ("NDMPcopy host"). The supporting network will transfer the data between the devices directly and send management messages to the NDMPcopy host. This direct transfer does not account for data transfers to an object-based storage such as a cloud destination.

Overview

Some embodiments optimize the costs of transferring data during data back up to a cloud storage. Cloud storage providers charge a minimum amount for data that is residing in cloud storage. Cloud storage providers also can charge for access of data in the cloud storage. For example, cloud storage providers can charge for each read from (get operation) and write to (put operation) the cloud storage. Some embodiments optimize data accesses of put operations to write data to the cloud to minimize the costs of such accesses.

As part of data backup to a cloud-based data storage, a data stream can be generated from the data storage. The data stream can then be partitioned into a number of slabs or objects (hereinafter "data objects"). For each data object, a put operation can be generated to write the data object to the cloud as part of the data backup. Additionally, each put operation can be partitioned into multi-threads. Each thread can then perform a put for writing at least part of the data object to the cloud storage. These multi-threads can also be executed simultaneously (at least in part) for performing the put operation for writing the data object to the cloud storage. Thus, each put operation can be a multi-part, multi-threaded put operation, wherein the data object is divided into parts and each part is assigned to a thread for the transfer.

In some embodiments, the number of put operations and size of the data objects in the put operations for the cloud backup of this data stream can be optimized. If the number of put operations for a data stream is too large, the costs can become too great. However, if the number of put operations for a data stream is too small, the latency of the backup to the cloud can be increased.

Thus, some embodiments optimize the number of put operations and size of the data objects in the put operations during a cloud backup based on a compromise between cost and speed of the cloud backup. In other words, minimizing of the number of put operations to reduce cost is weighed against backing up the data to the cloud in a timely manner. In some embodiments (as further described below), the number of put operations and size of the data objects in the put operations during a cloud backup are based on one or more of the following: 1) a maximum size of an object that a cloud is configured to store, 2) the maximum number of threads that can be used for a simultaneous transfer of a data object, and 3) the bandwidth of the connection to the cloud.

Example System

FIG. 1 depicts a conceptual diagram of a backup tool managing backup between a storage source and a cloud destination, according to some embodiments. In FIG. 1, a backup tool 101 handles backup of a data set from a storage controller 111 to a destination in a cloud 115. The backup tool 101 includes a backup manager 103. The storage controller 111 manages storage media 108. The storage media can be any storage device connected either directly to the storage controller 111 or via a network. Examples of the storage media 108 include an array of disk drives, an array of solid state drives, and a direct attached storage device. FIG. 1 uses alphabetical notations for a series of example operations. The alphabetical sequence A-F is an example to aid in understanding the description and not to be used to limit claim scope. The sequence of operations is performed in response to the backup tool 101 being invoked to backup a data set from the storage media 108 to a destination in the cloud 115. The backup is for a baseline or level 0 backup.

At a stage A, a backup manager 103 establishes a connection with the storage controller 111. To establish the connection, the backup manager 103 instantiates a listener process 107. The backup manager 103 communicates a connection endpoint identifier (e.g., network address of a host of the backup tool 101 and a logical socket) to the storage controller 111. Various services may also be spawned on either end of the established connection. The listener process 107 monitors the identified endpoint for receipt of data.

At a stage B, the backup manager 103 establishes a connection with the cloud destination. Since the destination can be any machine or virtual machine associated with a network address, FIG. 1 merely depicts the cloud 115. The backup manager 103 establishes the connection using a cloud interface 109, which can be an application programming interface (API) published by a cloud service provider that owns and/or manages the cloud 115.

At stage C, the backup manager 103 instructs the storage controller 111 to begin streaming the data set from the storage media 108 to the connection endpoint associated with the backup tool 101. The backup manager 103 sends a message to the storage controller 111 that requests the storage controller 111 to start streaming the data set to the previously communicated endpoint over the established connection. The storage controller 111 begins reading the data set (e.g., in data blocks or files) from the storage media 108. The storage controller transmits a data stream 113 to the backup tool 101 endpoint.

At stage D, the listener 107 detects receipt of elements of the data stream 113. In response to detecting receipt, the listener 107 passes received elements of the data stream to an object generator 105 of the backup tool 101. The listener 107 can pass each data stream element or groups of data stream elements. Passing the data stream element scan involve copying or moving the data stream elements to a buffer or queue associated with the object generator 105 (e.g., reserved memory space). Passing can also be referential passing (e.g., pointer and length).

At stage E, the object generator 105 generates data objects from the data stream 114. The data objects are stored in the cloud 115 using a number of put operations. In some embodiments, the number of put operations and size of the data objects in the put operations during a cloud backup are based on one or more of the following: 1) a maximum size of an object that a cloud is configured to store, 2) the maximum number of threads that can be used for a simultaneous transfer of a data object, and 3) the bandwidth of the connection to the cloud. The determination of the number of put operations and size of the data objects in the put operations, according to some embodiments, are further described below.

The object generator 105 generates a metadata object for the backup operation. Since the data stream is serialized, the object generator 105 generates the data objects in accordance with the order of the data stream elements. FIG. 1 depicts the object generator 105 generating three data objects: 1) metadata object MDATA.0, 2) DATA.0.0, and 3) DATA.0.1. The backup manager 103 encodes the metadata object as having object ID MDATA.0 to identify the object as containing metadata for a level 0 backup. The backup manager 103 encodes a data object as DATA.0.0 to identify the object as a first segment (i.e., segment 0) of a data stream or as a first data object of a data set. The backup manager 103 encodes a data object as DATA.0.1 to identify the object as a second segment or as a second data object of a data set. The backup manager 103 also determines an identifier for the set of objects generated from the backup data stream.

At stage F, the backup tool 101 supplies the data objects for storing into the cloud 115 via a cloud interface 109. The backup tool 101 stores the data objects into a data container 117 of the cloud 115 using put operations. The backup tool 101 identifies the data container 117 with the object set identifier that was determined by the backup manager 103. After a data set is backed up to a cloud as objects, the data set is likely restored from the objects at some later point in time. For example, the data set may comprise file system components such as hierarchical directory structures.

Figure 2:
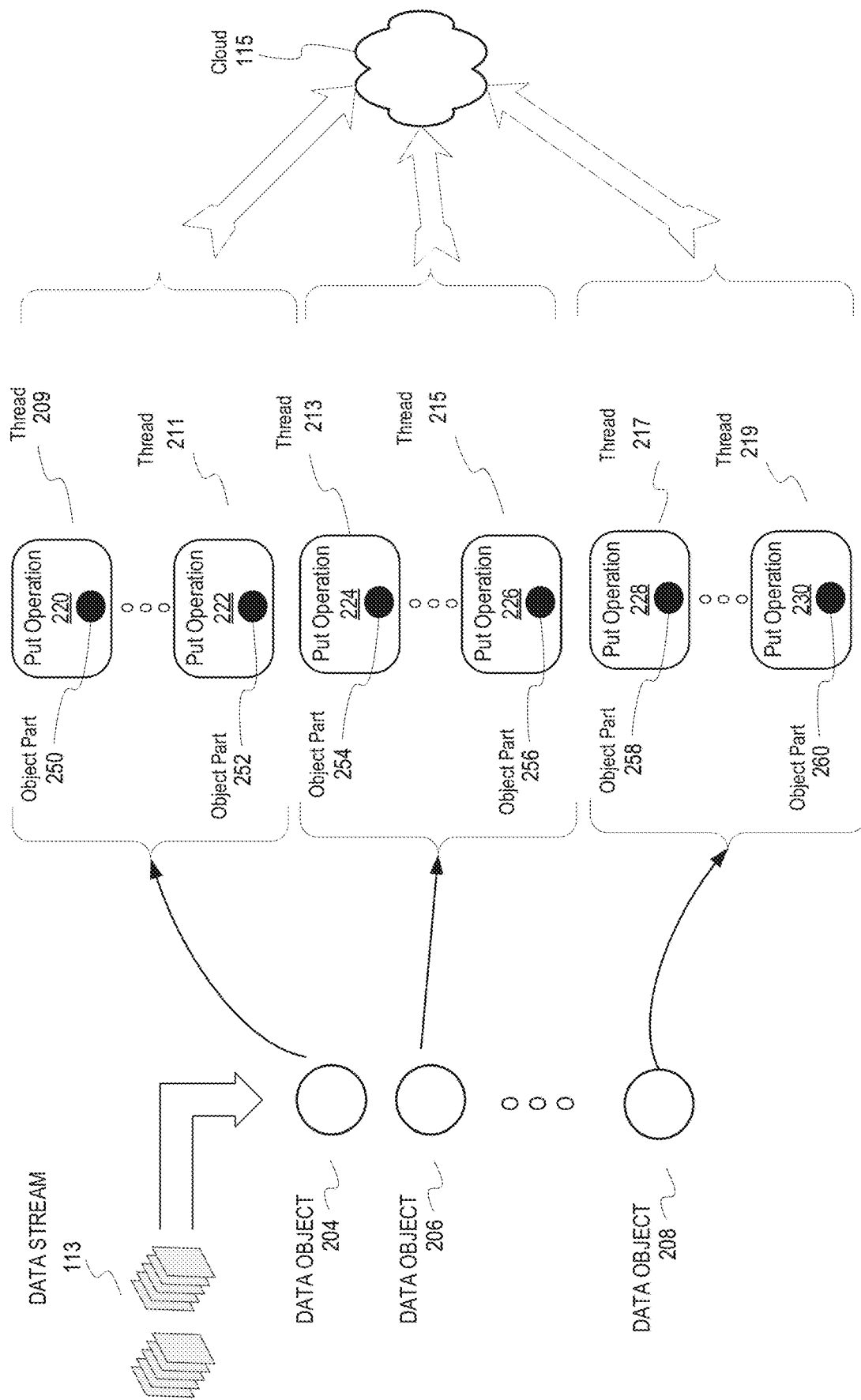
FIG. 2 depicts a conceptual diagram to illustrate relationships among the data stream, data objects, and multi-part, multi-threaded put operations for backup of the data objects derived from the data stream, according to some embodiments.

To further illustrate stage E of FIG. 1, FIG. 2 depicts a conceptual diagram to illustrate relationships among the data stream, data objects, and multi-part, multi-threaded put operations for backup of the data objects derived from the data stream, according to some embodiments. FIG. 2 depicts the data stream 113 and the cloud 115 of FIG. 1, wherein the data stream 113 is backed up to the cloud 115. A number of data objects (shown as data objects 204-208) are derived or generated from the data stream 113. Determination of the number and size of the data objects, according to some embodiments, is further described below (see description of FIGS. 3-4).

Each data object can then be separated into a number of object parts. Also, each object part can be simultaneously transmitted to the cloud 115 for backup using a put operation. Thus, each data object can be simultaneously transmitted to the cloud 115 for backup using multi-part, multi-threaded put operations. In this example, the data object 204 is separated into a number of object parts (object parts 250-252). The object part 250 is transmitted to the cloud 115 using a put operation 220 via an execution thread 209. The object part 252 is transmitted to the cloud 115 using a put operation 222 via an execution thread 211. The execution thread 209 and the execution thread 211 can be simultaneously executed (at least partially).

The data objects 206 and 208 can be similarly processed and transmitted to the cloud 115 using multi-part, multi-threaded put operations. In this example, the data object 206 is separated into a number of object parts (object parts 254-256). The object part 254 is transmitted to the cloud 115 using a put operation 224 via an execution thread 213. The object part 256 is transmitted to the cloud 115 using a put operation 226 via an execution thread 215. The execution thread 213 and the execution thread 215 can be simultaneously executed (at least partially). The data object 208 is separated into a number of object parts (object parts 258-260). The object part 258 is transmitted to the cloud 115 using a put operation 228 via an execution thread 217. The object part 260 is transmitted to the cloud 115 using a put operation 230 via an execution thread 219. The execution thread 217 and the execution thread 219 can be simultaneously executed (at least partially).

Example Operations

Figure 3:
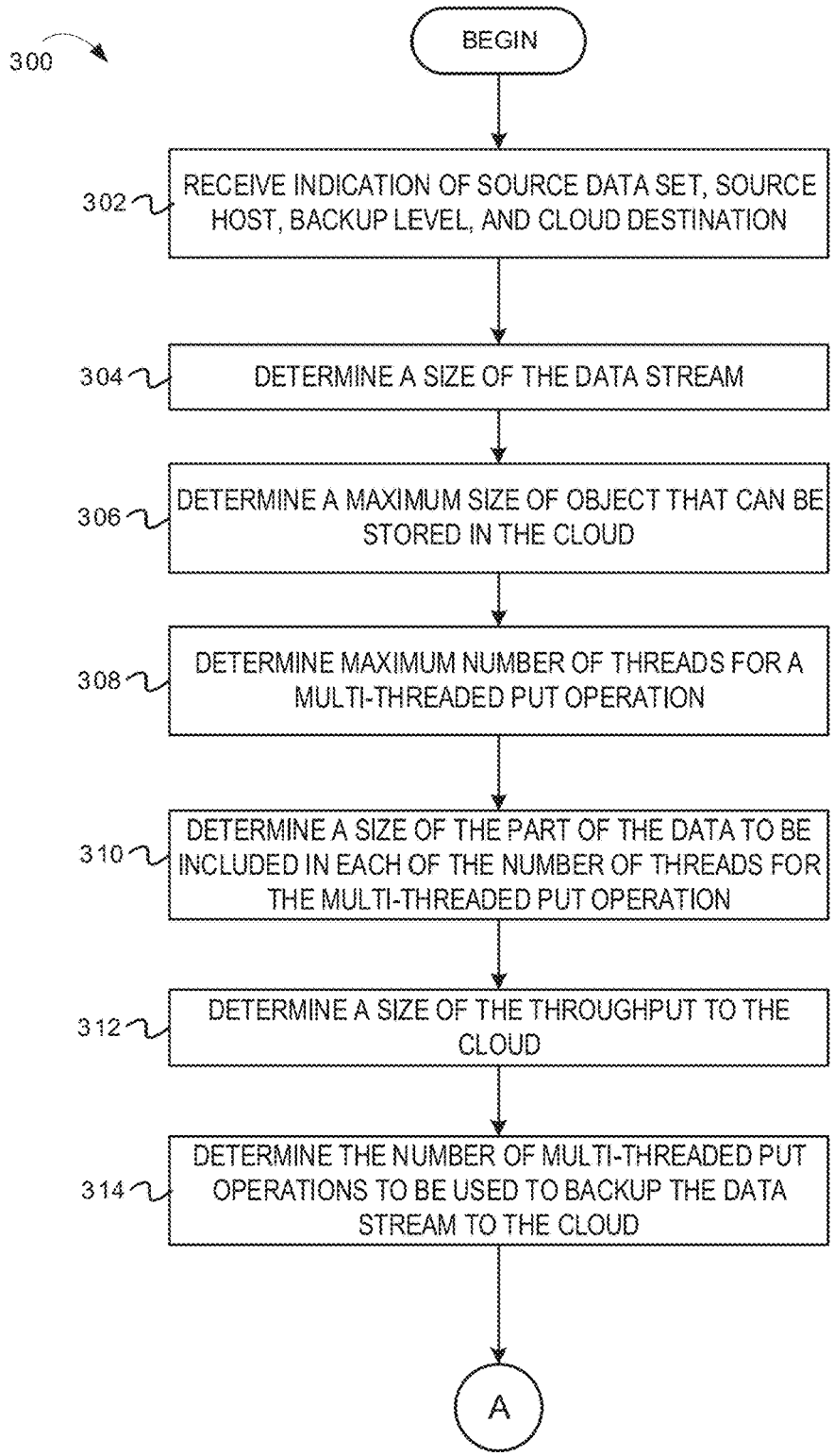
FIGS. 3-4 depict flowcharts for managing backup between a storage source and a cloud destination, according to some embodiments.
Figure 4:
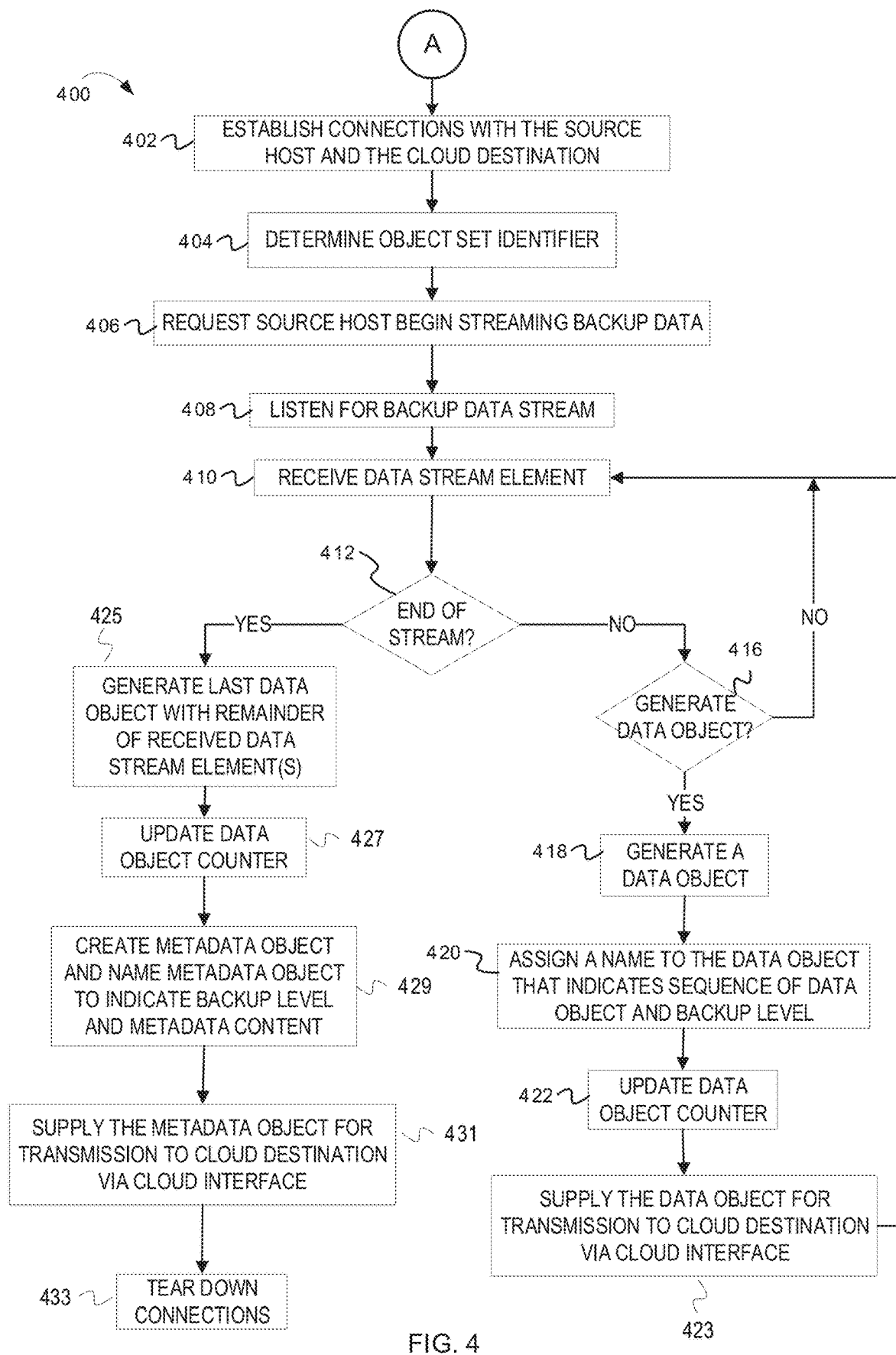

To further illustrate operations of the backup tool of FIG. 1, FIGS. 3-4 depict flowcharts for managing backup between a storage source and a cloud destination, according to some embodiments. A flowchart 300 of FIG. 3 and a flowchart 400 of FIG. 4 are described with reference to FIG. 1. Operations of the flowcharts 300-400 continue between each other through depicted transition points. Operations of the flowchart 300 and the flowchart 400 can be performed by software, firmware, hardware or a combination thereof (see for example the backup tool 101 in FIG. 1). The operations of the flowchart 300 start at block 302.

At block 302, a backup tool receives indication of a source data set, a source host, a backup level, and a cloud destination. This information can be entered by a user, read from a file, determined by another program, etc. Further, not all of this information requires explicit indication. For instance, the backup tool can maintain a history of backup operations and determine the backup level based on a last backup operation performed for the source data set. The source data set can be any of a volume, set of volumes, a file system, a set of qtrees, a directory, a subdirectory, etc. The source data set can be identified by name, path, etc. Often the source data set is a large data set. The meaning of large varies over time, but an example would be at least a few gigabytes in size. The data host and cloud destination can be indicated with names that resolve to respective network addresses, can be identified with the network addresses and port numbers, etc.

At block 304, the backup tool determines the size of the data stream (the source data set). The backup tool can make this determination by querying the storage controller for this information. The size of the data stream can vary among different backups (four Gigabytes, eight Gigabytes, 16 Gigabytes, etc.).

At block 306, the backup tool determines a maximum individual object size that can be stored in the cloud. The backup tool can make this determination by querying the cloud for this information. Different cloud service providers can configure their clouds to process objects of different maximum sizes (e.g., eight Gigabytes, four Gigabytes, etc.).

At block 308, the backup tool determines a maximum number of threads for a multi-part, multi-threaded put operation for storing data at the cloud. The execution threads can be executed within a same processor or multiple processors. Alternatively, each execution thread can be executed in a separate processor. Each thread of a multi-part, multi-threaded put operation can be executed simultaneously (at least partially). The maximum number of threads for a multi-part, multi-threaded put operation can be derived from the maximum size of the bandwidth available to transmit data from the backup tool to the cloud. In some embodiments, for every one Gigabit of bandwidth available, there can be 16 threads for a multi-part, multi-threaded put operation. Thus, a maximum number of threads for two Gigabits/second of bandwidth can be 32. A maximum number of threads for 3 Gigabits/second of bandwidth can be 48. However, a maximum number of threads for 500 Megabits/second of bandwidth can be 8.

At block 310, the backup tool determines a size of the part of the data that is partitioned to be included in each of the number of threads for the multi-part, multi-threaded put operation. The backup tool can make this determination by querying the cloud for this information. Different cloud service providers can configure their clouds to process a maximum size for each part in each of the number of threads (e.g., four Megabytes, two Megabytes, eight Megabytes, etc.). For example, the size of each part of the data that is partitioned to be included in each of the number of threads can be determined as follows:

size of each part=size of the data stream/max. size of objects/max. # of threads Therefore, assume the following:
size of the data stream=256 Terabytes,
maximum size of objects=8 Megabytes, and
maximum # of threads is 16

Thus in this example, the size of each part into which an object will be partitioned into each thread of a multi-part, multi-threaded put operation would be 256 Terabytes/8 Megabytes/16=2 Megabytes.

At block 312, the backup tool determines a maximum size of the bandwidth from the backup tool to the cloud. The backup tool can measure the maximum size of the bandwidth using different tools, depending on the type of network, type of protocol, and type of platforms. The backup tool can perform a test by measuring the period for transmitting a file of a defined size to the cloud. The maximum size of the bandwidth can be a number of bits per second.

At block 314, the backup tool determines the number of multi-part, multi-threaded put operations to be used to backup the data stream to the cloud. In some embodiments, the number of multi-part, multi-threaded put operations to be used is based on one or more of the following:

size of the data transfer
size of each part of the data to be transferred in each of the number of threads for a multi-part, multi-threaded put operation, and
maximum number of threads for a multi-part, multi-threaded put operation for storing data at the cloud.

For example, the number of put operations can be determined as follows:

# of put operations=size of the data stream/size of each part/max. # of threads

For example, assume the following:
size of the data stream=4 Gigabytes,
size of each part=4 Megabytes, and
maximum # of threads is 64

In this example, the number of multi-part, multi-threaded put operations would be 1000/64=16. Operations of the flowchart 300 continue at transition point A, which continues at transition point A of the flowchart 400.

From transition point A of the flowchart 400, operations continue at block 402.

At block 402, the backup tool establishes connections with the source host and the cloud destination. In the case of an NDMP compliant backup tool, the backup tool establishes a control connection with the source host and then a data connection. In addition, the backup tool maintains an NDMP state machine in accordance with control messages exchanged over the control connection. Both connections can be transfer control protocol/internet protocol (TCP/IP) based connections.

At block 404, the backup tool determines an object set identifier. The object set identifier can be explicitly indicated along with the backup command in block 202. Alternatively, the backup tool can generate the backup set identifier based, at least in part, on the identity of the source data set.

At block 406, the backup tool requests that the source host begin streaming the source data set. For example, the backup tool sends a request message over a control connection to the source host. As part of establishing the connections, the backup tool provides to the source host an identifier for a connection endpoint associated with the backup tool. The source host will start reading units of the data set (e.g., blocks, files, chunks, etc.) from the storage medium or media hosting the data set and streaming the data set units to the identified connection endpoint. The data set units will be manipulated in accordance with the communication protocol supporting the data connection, but the backup tool will perceive receiving the data set units read by the source host.

At block 408, the backup tool listens for the backup stream from the source host. After sending the request to the source host, the backup tool launches a daemon, thread, or process that monitors or polls a memory location (e.g., buffer, queue, etc.) for receipt of elements of the data stream.

At block 410, the backup tool receives a data stream element. The launched process (i.e., listener) detects receipt of the element of the data stream. The listener can notify a managing process of the detected receipt. The listener can communicate data stream elements, expressly or referentially, to another process that creates objects for cloud storage.

At block 412, the backup tool determines whether the received data stream element indicates an end of stream marker. If the received data stream element indicates an end of stream marker (or includes an end of stream marker), then control flows to block 425. If the received data stream element does not indicate the end of stream marker, then control flows to block 416.

At block 416, the backup tool determines whether a data object should be generated. In some embodiments, a size is defined for a data object based on the number of multi-part, multi-threaded put operations and the size of the data stream. For example, the size of the data object can be determined as follows:

size of data object=size of the data stream/# of multi-part, multi-threaded put operations To illustrate, assume the following:
size of the data stream=16 Terabytes, and
# of multi-part, multi-threaded put operations=4 Megabytes, and In this example, the size of the data object would be 16 Terabytes/4 Megabytes=4 Megabytes.

When data from the data stream sufficient to satisfy the data size is received, the backup tool generates a data object. To illustrate, a volume being backed may be 500 gigabytes (GB). If a data stream element is 4 kilobytes (KB) and the defined maximum data object size is 2 GB, then the backup tool will generate a data object every 524,288 data stream elements. The backup tool can determine that a data object should be generated based on counting the number of data stream elements queued for generation of a data object. As another example, the backup tool can determine that the data object should be generated in response to detecting a queue(s) corresponding to object size is full. If a data object should not be generated, then control flows to back to block 410. If a data object is to be generated, then control flows to block 418.

At block 418, the backup tool generates a data object by inserting data stream elements into a queue(s) of a size that corresponds to the object size. The data stream elements are inserted in accordance with their serialization. To generate the data object, the backup tool wraps the constituent data stream elements with delimiters indicating the beginning and end of the content of the data objects and creates bookkeeping data (i.e., metadata) for the data object (e.g., actual size of the data object). For example, if the source data is a file system volume including hierarchical directory structures.

At block 420, the backup tool assigns a name to the data object. The name is in accordance with a predefined naming scheme that reflects the multiple levels of backup and serialization of the data stream. To capture the serialization of the data stream, the name will encode a sequence of the data objects that conforms to the serialization of the data stream. Unless done prior to actual creation of the data object, the backup tool updates metadata of the data object to indicate the name of the data object.

At block 422, the backup tool updates a data object counter. The backup tool tracks the number of data objects created for a backup session for later recording into a metadata object.

At block 423, the backup tool supplies the data object for transmission to the cloud destination via a cloud interface. For instance, the backup tool calls a function defined by a cloud API that transmits the data object to the cloud destination. Due to the size of the data object, the backup tool can invoke a function or procedure that breaks apart the data objects and transmits the different pieces of the objects to the cloud destination concurrently, over multiple connections. In other words, the backup tool can decompose the data object and reconstruct the data object at the cloud destination. FIG. 4 depicts control flowing back from block 423 to block 410, but block 410 likely occurs concurrently with the sequence of operations defined by blocks 412, 416, 418, 420, 422, and 423 or a subset of those blocks. Moreover, transmission of the data object to the cloud destination (423) may be an asynchronous, concurrent operation with the other operations of FIGS. 3-4.

When a received data stream element indicates end of stream (block 412), control flows to block 425. At block 425, the backup tool generates a last data object with a remainder of the received data stream elements. For the last data object of an object set, constituent data stream elements may not reach the maximum size of the data object.

At block 427, the backup tool updates the data object counter.

At block 429, the backup tool creates a metadata object for the object set. As a reminder, the object set corresponds to the data set being backed up. The metadata object for the object set at least indicates the number of data objects that form the object set. This inventory information is used when creating the backup image from the data objects. The backup tool names the metadata object with a name that encodes the backup level. Considering the relatively small size of the metadata, the metadata object will be no more than a single object. Additional examples of metadata that can be recorded in the metadata object include the name of the source host, network address of the source host, the data set identifier, and the backup engine running on the source host.

At block 431, the backup tool supplies the metadata object for transmission to the cloud destination via the cloud interface.

At block 433, the backup tool may remove the connections or can determine whether another backup operation has been requested for a data set that is also hosted on the source host. If so, the backup can maintain the connections for subsequent backup operation targeting a different data set.

Example Computer Device

Figure 5:
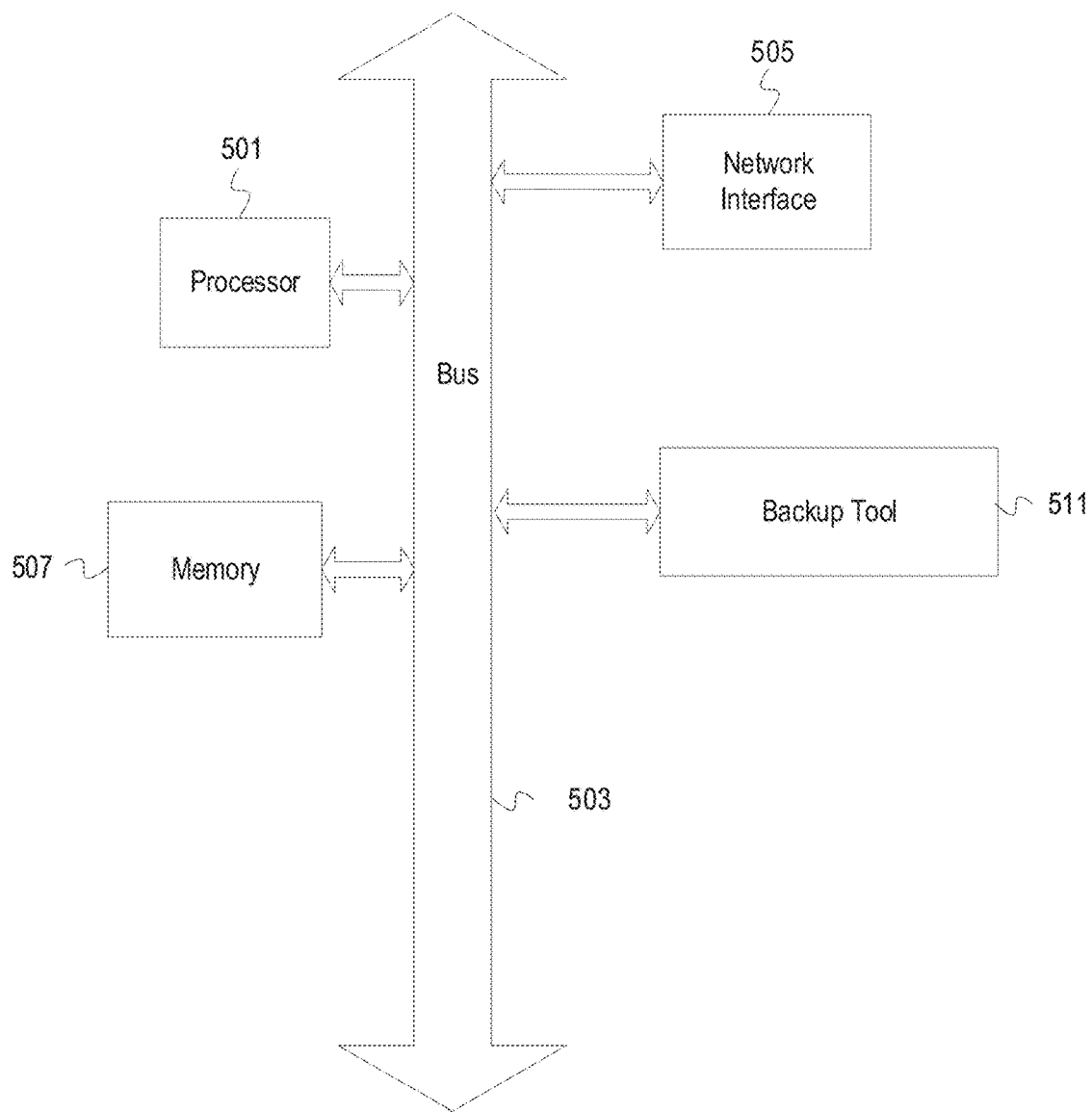
FIG. 5 depicts an example computer device, according to some embodiments.

FIG. 5 depicts an example computer device, according to some embodiments. The computer device includes a processor 501 (possibly including multiple processors, multiple cores, multiple nodes, and/or implementing multi-threading, etc.). The computer device includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media.

The computer device also includes a bus 503 (e.g., PCI, ISA, PCI-Express, HyperTransport® bus, InfiniBand® bus, NuBus, etc.) and a network interface 505 (e.g., a Fiber Channel interface, an Ethernet interface, an internet small computer system interface, SONET interface, wireless interface, etc.). The computer device also includes a backup tool 511. The backup tool 511 represents the backup tool 101 of FIG. 1 which handles backup of a data set from a storage controller to a destination in a cloud using multiple multi-part, multi-threaded put operations (as described above). Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

Terminology

This description uses shorthand terms related to cloud technology for efficiency and ease of explanation. When referring to "a cloud," this description is referring to the resources of a cloud service provider. For instance, a cloud can encompass the servers, virtual machines, and storage devices of a cloud service provider. The term "cloud destination" and "cloud source" refer to an entity that has a network address that can be used as an endpoint for a network connection. The entity may be a physical device (e.g., a server) or may be a virtual entity (e.g., virtual server or virtual storage device). In more general terms, a cloud service provider resource accessible to customers is a resource owned/manage by the cloud service provider entity that is accessible via network connections. Often, the access is in accordance with an application programming interface or software development kit provided by the cloud service provider.

This description uses the term "data stream" to refer to a unidirectional stream of data flowing over a data connection between two entities in a session. The entities in the session may be interfaces, services, etc. The elements of the data stream will vary in size and formatting depending upon the entities communicating with the session. Although the data stream elements will be segmented/divided according to the protocol supporting the session, the entities may be handling the data at an operating system perspective and the data stream elements may be data blocks from that operating system perspective. The data stream is a "stream" because a data set (e.g., a volume or directory) is serialized at the source for streaming to a destination. Serialization of the data stream elements allows for reconstruction of the data set. The data stream is characterized as "flowing" over a data connection because the data stream elements are continuously transmitted from the source until completion or an interruption. The data connection over which the data stream flows is a logical construct that represents the endpoints that define the data connection. The endpoints can be represented with logical data structures that can be referred to as interfaces. A session is an abstraction of one or more connections. A session may be, for example, a data connection and a management connection. A management connection is a connection that carries management messages for changing state of services associated with the session.

This description uses the term "backup image" to refer to a file(s) that at least contains or references data and information about structural organization of the data. A backup image can have additional data/information. For instance, a backup image may also have a copy of an operating system and system state (e.g., a virtual machine backup image, a filesystem backup image, etc.). A backup image can also have additional information for restoring the data in accordance with the structural organization (e.g., indication of a compression scheme).

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted for movement of data blocks between nodes of the data structure can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium. A machine readable storage medium does not include transitory, propagating signals.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for sequenced-ordered translation for data storage as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

What is claimed is:

1. A method for backing up a data set from a source host to a cloud storage destination, the method comprising:
    determining a quantity of multi-threaded put operations for writing a plurality of data objects to the cloud storage destination based, at least in part, on a cost of a backup to the cloud storage destination and a latency of the backup to the cloud storage destination;
    generating the plurality of data objects from a data stream received from the source host, the data stream being associated with the data set, including,
        generating a first data object of the plurality of data objects from a first plurality of stream elements of the data stream;
        updating a data object counter in accordance with generating the first data object, the data object counter configured to track the plurality of data objects for the backup;
        generating a second data object of the plurality of data objects from a second plurality of stream elements of the data stream;
        updating the data object counter in accordance with generating the second data object; and
        creating a metadata object to indicate a state of the data object counter and a backup level associated with the plurality of data objects;
    transmitting the metadata object to the cloud storage destination; and
    storing the plurality of data objects using the quantity of multi-threaded put operations into the cloud storage destination.

2. The method of claim 1, wherein generating the first data object comprises assigning a name to the first data object, the name indicating a sequence of the first data object and the backup level.

3. The method of claim 1, further comprising determining a size for the first data object and the second data object based at least in part on the quantity of multi-threaded put operations and a size of the data stream.

4. The method of claim 1, wherein a name of the metadata object encodes the backup level.

5. The method of claim 1, further comprising:
    determining a name for the plurality of data objects; and
    saving the name for the plurality of data objects to the metadata object.

6. The method of claim 1, wherein generating the second data object comprises:
receiving an end of stream indication in the second plurality of stream elements, wherein the second plurality of stream elements comprises a remainder of data stream elements after generation of the first data object, and wherein the second plurality of stream elements is smaller than the first plurality of stream elements.

7. The method of claim 1, wherein the method is performed by a backup tool that is separate from the source host and the cloud storage destination.

8. A non-transitory machine readable medium having stored thereon instructions for performing a method comprising machine executable code which when executed by at least one machine, causes the machine to:
determine a quantity of multi-threaded put operations for writing a plurality of data objects to a cloud storage destination based, at least in part, on a cost of a backup to the cloud storage destination and a latency of the backup to the cloud storage destination;
generate the plurality of data objects from a data stream received from a source host, the data stream being associated with the data set, including,
generate a first data object of the plurality of data objects from a first plurality of stream elements of the data stream;
generate a second data object of the plurality of data objects from a second plurality of stream elements of the data stream;
update a data object counter in accordance with generating the first data object and the second data object, the data object counter configured to track the plurality of data objects for the backup; and
create a metadata object to indicate a state of the data object counter and a backup level associated with the plurality of data objects;
supply the metadata object to a cloud interface for transmission to the cloud storage destination; and
store the plurality of data objects using the quantity of multi-threaded put operations into the cloud storage destination.

9. The machine readable medium of claim 8, wherein the instructions to generate the first data object comprises instructions to assign a name to the first data object, the name indicating a sequence of the first data object and the backup level.

10. The machine readable medium of claim 8, further comprising instructions to determine a size for the first data object and the second data object based at least in part on the quantity of multi-threaded put operations and a size of the data stream.

11. The machine readable medium of claim 8, wherein a name of the metadata object encodes the backup level.

12. The machine readable medium of claim 8, further comprising instructions to:
determine a name for the plurality of data objects; and
save the name for the plurality of data objects to the metadata object.

13. The machine readable medium of claim 8, wherein the instructions to generate the second data object comprise instructions to:
receive an end of stream indication in the second plurality of stream elements, wherein the second plurality of stream elements comprises a remainder of data stream elements after generation of the first data object, and wherein the second plurality of stream elements is smaller than the first plurality of stream elements.

14. A computing device comprising:
a memory containing machine readable medium comprising machine executable code having stored thereon instructions for performing a method of backing up a data set from a source host to a cloud storage destination; and
a processor coupled to the memory, the processor configured to execute the machine executable code to cause the processor to:
determine a quantity of multi-threaded put operations for writing a plurality of data objects to the cloud storage destination based, at least in part, on a cost of a backup to the cloud storage destination and a latency of the backup to the cloud storage destination;
generate the plurality of data objects from a data stream received from the source host, the data stream being associated with the data set, including,
generate a first data object of the plurality of data objects from a first plurality of stream elements of the data stream;
generate a second data object of the plurality of data objects from a second plurality of stream elements of the data stream;
update a data object counter in accordance with generating the first data object and the second data object, the data object counter configured to track the plurality of data objects for the backup; and
create a metadata object to indicate a state of the data object counter and a backup level associated with the plurality of data objects;
supply the metadata object to a cloud interface for transmission to the cloud storage destination; and
store the plurality of data objects using the quantity of multi-threaded put operations into the cloud storage destination.

15. The computing device of claim 14, comprising a backup tool configured to generate the plurality of data objects, wherein the backup tool is separate from the source host and the cloud storage destination.

16. The computing device of claim 14, wherein the processor is further configured to assign a name to the first data object, the name indicating a sequence of the first data object and the backup level.

17. The computing device of claim 14, wherein the processor is further configured to determine a size for the first data object based at least in part on the quantity of multi-threaded put operations and a size of the data stream.

18. The computing device of claim 17, wherein a name of the metadata object encodes the backup level.

19. The computing device of claim 17, wherein the processor is further configured to:
determine a name for the plurality of data objects; and
save the name for the plurality of data objects to the metadata object.

20. The computing device of claim 14, wherein the processor is further configured to:
receive an end of stream indication in the second plurality of stream elements, wherein the second plurality of stream elements comprises a remainder of data stream elements after generation of the first data object, and wherein the second plurality of stream elements is smaller than the first plurality of stream elements.

* * * * *